United States Patent [19]
Boccagno et al.

[11] Patent Number: 5,680,961
[45] Date of Patent: Oct. 28, 1997

[54] CONFIGURABLE SYSTEM FOR SUPPLYING MOLTEN THERMOPLASTIC MATERIAL

[75] Inventors: George E. Boccagno, Lawrenceville; Carl C. Cucuzza, Loganville; Richard D. Leyva, Lilburn; Shahid A. Siddiqui, Roswell, all of Ga.

[73] Assignee: Nordson Corporation, Westlake, Ohio

[21] Appl. No.: 549,883

[22] Filed: Oct. 30, 1995

[51] Int. Cl.⁶ .................................................. B67D 5/62
[52] U.S. Cl. .................. 222/143; 219/421; 222/146.5; 222/129; 222/255
[58] Field of Search ................. 222/143, 146.1, 222/146.2, 146.5, 129, 255; 219/420, 421, 422, 424, 426, 427

[56] References Cited

U.S. PATENT DOCUMENTS

| | | | |
|---|---|---|---|
| 2,047,164 | 7/1936 | Coleman | 222/143 X |
| 3,964,645 | 6/1976 | Scholl | 222/146.5 |
| 4,308,447 | 12/1981 | Notzold et al. | 219/421 |
| 4,509,669 | 4/1985 | Rogers | 219/420 X |
| 4,771,920 | 9/1988 | Boccagno et al. | 219/421 X |
| 4,811,863 | 3/1989 | Claassen | 222/146.5 |
| 4,821,922 | 4/1989 | Miller et al. | 222/146.2 X |
| 4,919,308 | 4/1990 | Majkrzak | 222/146.5 |
| 5,143,255 | 9/1992 | Micek | 222/143 X |
| 5,318,198 | 6/1994 | Micek et al. | 222/143 X |

*Primary Examiner*—Kevin P. Shaver
*Attorney, Agent, or Firm*—Rankin, Hill, Lewis & Clark

[57] ABSTRACT

A system for supplying molten thermoplastic material to a dispenser has a hopper assembly which is made up of one or more hopper units each having opposite side walls being generally parallel to each other, the inlet and the outlet having generally the same cross section, so that the hopper units can be stacked on top of each other to increase the capacity of the hopper assembly. The hopper assembly might be supported on a plurality of reservoir blocks, with the hopper assembly straddling the plurality of reservoir blocks to supply melted material to all of the reservoirs. At least one isolator may be provided for thermally isolating one of the hopper units from the reservoir block and for thermally isolating the hopper units from each other, the isolator comprising a band of insulating material positioned between the flanges of the hopper unit and the reservoir block. The hopper assembly is preferably attached to the reservoir block by a plurality of clamps. Each of the clamps including at least one spring member to retain thrust force on the thrust member while accommodating expansion and contraction of the flanges.

13 Claims, 7 Drawing Sheets

CONFIGURABLE SYSTEM FOR SUPPLYING MOLTEN THERMOPLASTIC MATERIAL

BACKGROUND OF THE INVENTION

1. Field of the Invention

This invention relates to apparatus for melting and supplying thermoplastic materials to a dispensing system.

2. Description of the Prior Art

Thermoplastic materials or so-called "hot melt" materials have been used for many years for various purposes, including as adhesives in the manufacturing of products such as disposable diapers and in the manufacturing of packaging. Historically, the thermoplastic material was converted from a solid to a molten state in a tank having heated walls. The melted material was maintained in the molten state in the tank in sufficient volume to supply one or more applicators or dispensers. If the job or application required a substantial volume of hot melt material, a substantially large volume of material was required to be maintained in the molten or melted state, necessitating a long warm up or start up time for the apparatus, as well as prolonged exposure of at least some of the molten material to heat and/or to oxygen.

To avoid these problems, so-called grid-type hot melt supply systems were developed in which the solid thermoplastic material was stored in a hopper and melted upon the top of a heated grid located at the bottom of the hopper. The melted material then passed through holes in the grid into a relatively small holding reservoir from which the molten material was supplied by a pump beneath the reservoir to a dispenser. Grid-type supply systems have been capable of melting and supplying thermoplastic material in a very high rate, and the molten material is not maintained in a molten state for prolonged periods of time to char, oxidize, or otherwise degrade. A typical grid type hot melt supply system is disclosed in U.S. Pat. No. 3,946,645.

The solid thermoplastic material is stored in a hopper located above the grid melter. The sides of the hopper sloped, either inwardly or outwardly, to create a "draft". While the draft assisted in the manufacture of the cast hopper members since the casting insert could be more easily removed, it also assisted in handling the expansion of the thermoplastic during reheating. When the system was shutdown, the thermoplastic material above the melting grid solidified, forming a solid mass of material extending across the hopper. As the material beneath this solid mass reheated, it expanded, and the expansion of the material could provide pressure against the seals of the hopper and the reservoir, creating leaks. By providing the draft in which the upper portion of the hopper sloped outwardly, the solid mass of material was easily forced upwardly to accommodate this expansion and avoid the creation of pressures below the mass.

The hopper should be large enough to store a sufficient quantity of solid thermoplastic material, so that it does not need to be replenished frequently. However, if the system requirements are low, a large hopper is inconvenient and can waste energy. Therefore, it is frequently necessary to design the system according to the requirements for the specific application involved. If the application requirements change, the system must be re-designed for the new requirements. For example, a larger system may be required in order to achieve a greater flow rate, or separate additional systems may be acquired if different thermoplastic materials are being dispensed simultaneously.

The hopper has usually been attached to the reservoir by providing the bottom of the hopper with a flange and bolting the flange to the reservoir. The heating grid could be bolted between the hopper and the reservoir in the same manner. A nonmetallic component, such as a ceramic member, may also be included as part of this assembly. The system was typically assembled when cool, and the components were heated and maintained at a desired running temperature. The heating grid was typically maintained at a much higher temperature than the hopper, and since some of the metal components would be maintained at different temperatures, they would have different amounts of thermal expansion. If non-metal components were included, they have different rates of thermal expansion than the metal components. It was necessary to shut down the system occasionally for maintenance or repair, and, when this occurs, the components cool and return to their initial temperature. The different amounts of thermal expansion of the components and the heating and cooling of the system would cause the bolts which hold the components together to loosen over time. If the components expanded more than the bolts, the bolts would gouge the softer aluminum material, exacerbating the loosening effect. Eventually, if the bolts became loose enough, the seals between the components would fail allowing molten thermoplastic material to leak from the system. To avoid this problem, the bolts needed to be tightened periodically. If the bolts were not repeatedly tightened, system leakage could occur.

SUMMARY OF THE INVENTION

The present invention provides a molten thermoplastic supply system with a configurable hopper design which allows for different hopper configurations in order to accommodate different material supply requirements. In accordance with the present invention, the hopper assembly comprises different hopper units, which may be, for example, stacked on top of each other to increase the capacity of the hopper assembly. In addition, the system accommodates larger sized hopper units which can be used to straddle double supply systems to use a single thermoplastic supply for a plurality of other supply components.

In order to allow the hoppers to be stacked, the hoppers are made without a "draft", that is without sloping inward or outward interior surfaces. This provides that the inlet and outlet of each hopper member matches in dimensions so that hopper elements can be stacked on top of each other to create hopper assemblies having greater capacity. While prior art hoppers had drafts to assist in handling the expansion of the thermoplastic material when the system was started up and the solid adhesive melted, this need is avoided in the present invention by using a heated hopper with heating elements cast into the hopper to initially heat the adhesive along the hopper sides during start-up. When this adhesive melts first, it moves easily relative to the hopper walls, so that no draft is needed. The stackable hopper units permit the user to reconfigure the hopper capacity without buying separate hopper units for this purpose.

Providing a larger hopper unit also allows the user to configure the system so that the same adhesive can be fed through several grid/reservoir assemblies, so that the other supply components can be used efficiently. If needs change, the hopper assembly can be reconfigured and separate smaller hopper units can be used so that the system can supply different adhesives which are separated from one another.

The present invention thus provides a plurality of hopper units, and each of the hopper units can be set to a different temperature. The present invention also provides a plurality of thermal isolators which are located between the hopper units and between the bottom hopper unit and the reservoir block. The isolators are preferably formed of a material which does not readily conduct heat, such as a ceramic material. The isolators allow the hopper assembly to be more easily maintained at a different temperature from the reservoir block. In addition, the isolators allow each of the hopper units to be set at a different temperature so that, for example, the lower hopper unit can be set at a higher temperature than the hopper unit above it.

These and other advantages are provided by the present invention of a system for supplying melted thermoplastic material to a dispenser. The system comprises a reservoir block for receiving melted material. The reservoir block includes a reservoir into which melted material may flow, and the reservoir block has a flange. The system also comprises a hopper assembly for storing solid thermoplastic material. The hopper assembly is supported on the reservoir block and has a flange adjacent to the reservoir block flange. The hopper assembly has a top inlet and a bottom outlet. A heating grid is at the outlet of the hopper for heating and melting the solid thermoplastic material in the hopper. A manifold and pump assembly is connected to the reservoir block for receiving material from the reservoir and pumping the material to the dispenser.

The hopper assembly is preferably made up of one or more hopper units each having opposite side walls which are generally parallel to each other. The inlet and the outlet have generally the same cross section, so that the hopper units can be stacked on top of each other to increase the capacity of the hopper assembly. The hopper assembly might be supported on a plurality of reservoir blocks, with the hopper assembly straddling the plurality of reservoir blocks to supply melted material to all of the reservoirs. At least one isolator may be provided for thermally isolating one of the hopper units from the reservoir block and for thermally isolating the hopper units from each other, the isolator comprising a band of insulating material positioned between the flanges of the hopper unit and the reservoir block.

The hopper assembly is preferably attached to the reservoir block by a plurality of clamps. Each of the clamps comprises a pair of arms defining a space into which the flanges are positioned. A thrust member engages the flanges to hold the flanges against one of the arms. A clamping mechanism secures the thrust member, the clamping mechanism including at least one spring member to retain thrust force on the thrust member while accommodating expansion and contraction of the flanges.

DETAILED DESCRIPTION OF THE PREFERRED EMBODIMENT

Figure 1:
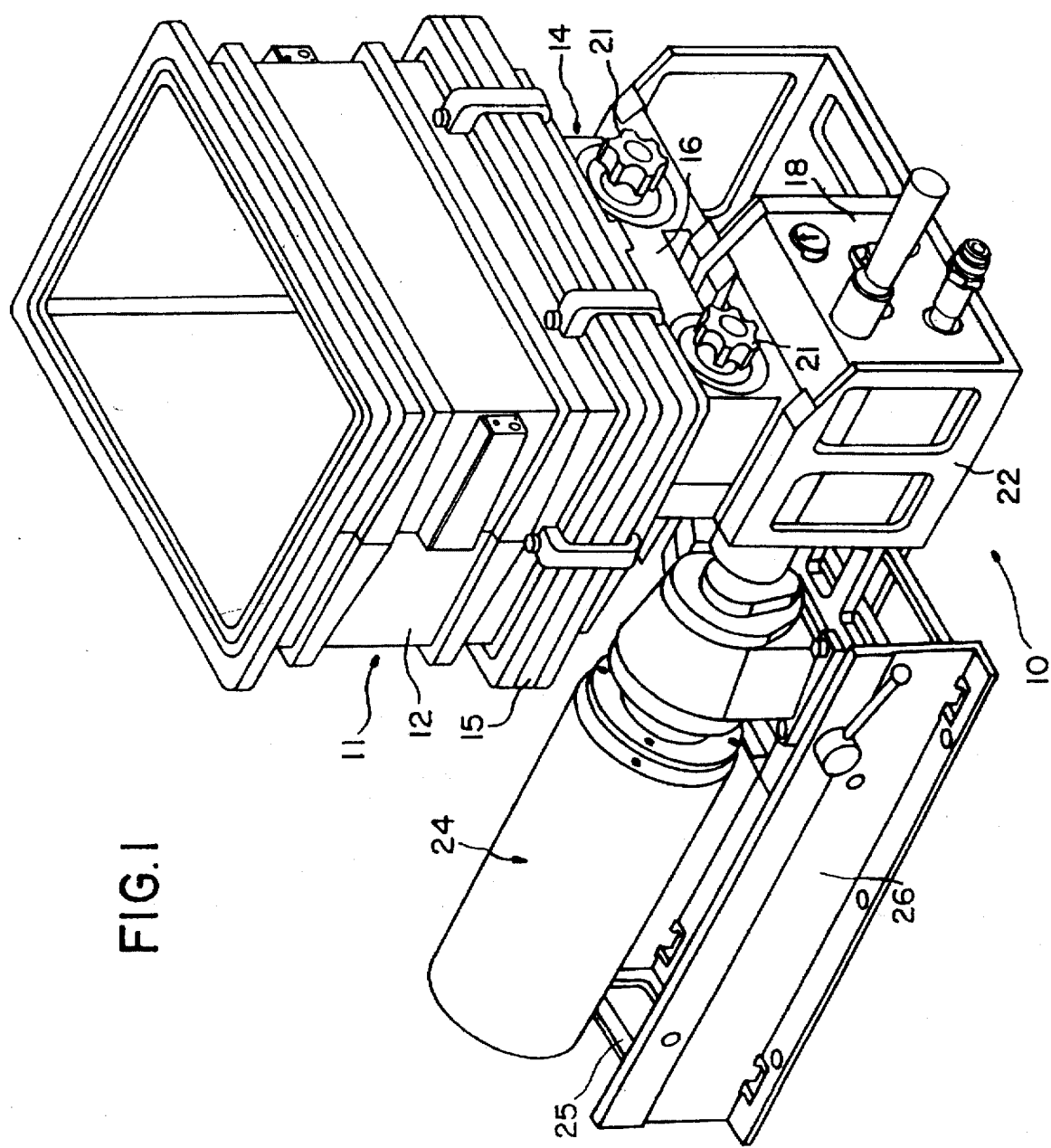
FIG. 1 is a perspective front view of the thermoplastic supply system of the present invention, with the support structure omitted.
Figure 2:
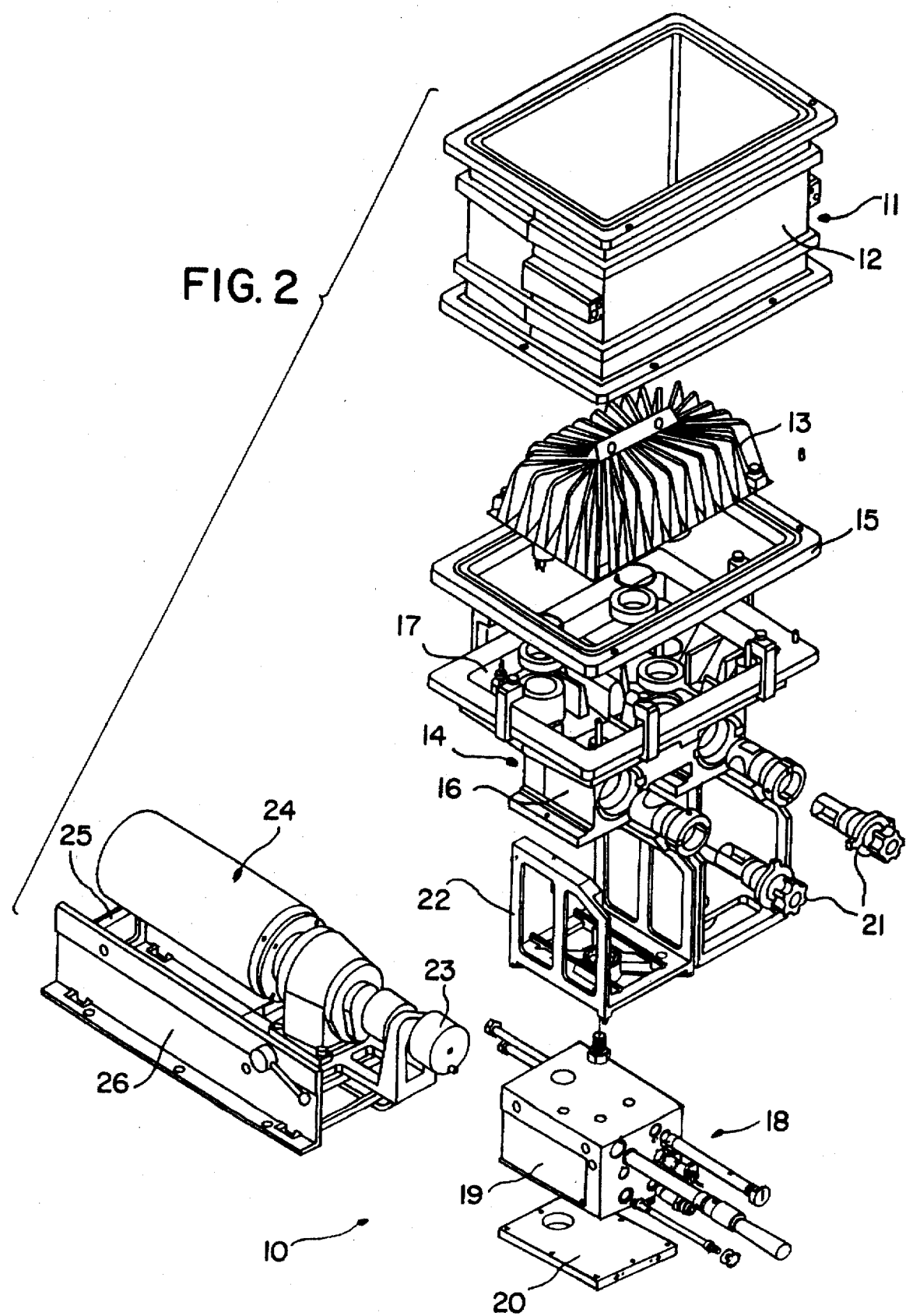
FIG. 2 is an exploded perspective front view of the thermoplastic supply system of FIG. 1.

Referring more particularly to the drawings and initially to FIGS. 1 and 2, there is shown the thermoplastic material supply system 10 of the present invention. The system is used for various purposes, such as to apply hot melt adhesive in a manufacturing line for specific products, such as for disposable diapers. A manufacturing line of disposable diapers may include, by way of example, a station for applying adhesive to the left and right leg elastic, to the waist elastic attachment and to the cuff elastic. The supply system 10 is connected to dispensers or applicators located at the manufacturing line by means of heated supply hoses. Various types of dispensers or applicators may be in the manufacturing line to apply the material, and these dispensers are not part of this invention. The supply system 10 is used to heat the solid thermoplastic material and to supply the molten material through various numbers of supply hoses to the dispensers.

The system 10 comprises a hopper assembly 11 for receiving and storing a supply of solid thermoplastic material. The hopper assembly 11 comprises one or more hopper units 12. The top of the hopper assembly 11 is open, allowing solid thermoplastic material to be placed in the hopper assembly. The bottom of the hopper assembly 11 is also open providing an outlet, and a heating grid 13 is mounted within the outlet of the hopper assembly. The heating grid 13 is used to melt the solid thermoplastic material in the hopper. Although the grid 13 is not in the form of a grid in the conventional definition of the term, since it is in the form of a pyramid-shaped cast block, it replaces the heating grids used in prior art systems, so it is called a "grid". The hopper assembly 11 is supported on a reservoir assembly 14 located below the hopper assembly 11, with a ceramic isolator 15 mounted therebetween. The reservoir assembly includes a block 16, the upper surface of which forms a reservoir 17 which receives a supply of melted material from the hopper assembly 11. Inside the reservoir block 16 are a pair of passageways through which the molten thermoplastic flows from the reservoir to a pair of manifold assemblies 18 positioned beneath the reservoir block. (Only one of the manifold assemblies is shown in FIGS. 1 and 2.) Each manifold assembly 18 includes a manifold block 19. The manifold block 19 may include an internal heater or may be heated by means of a separate attached heater plate 20. The reservoir assembly 14 includes a pair of flow shutoff valves 21 mounted in the reservoir block 16 each of which allows the flow of molten material through one of the passageways to one of the manifold assemblies to be shut off. Each of the flow shutoff valves 21 also includes a filter or protection screen to prevent extraneous particulate material from reaching the pump. The manifold assemblies 18 are inserted into a manifold harness or saddle 22 which is suspended from the bottom of the reservoir block 16. The manifold assembly is inserted into the harness and held securely against the reservoir block by means of a screw jack assembly. A pump 23 is adapted to be inserted into each of the manifold assemblies 18. Each of the pumps 23 is connected to a drive assembly 24, and the pump and the drive assembly are mounted on a horizontally moveable carriage 25 which moves on a carriage support 26.

Each of the manifold assemblies 18 includes a connection for one or more supply hoses (not shown). The molten thermoplastic material is pumped from the manifold assemblies 18 to dispensing heads through the supply hoses.

Figure 3:
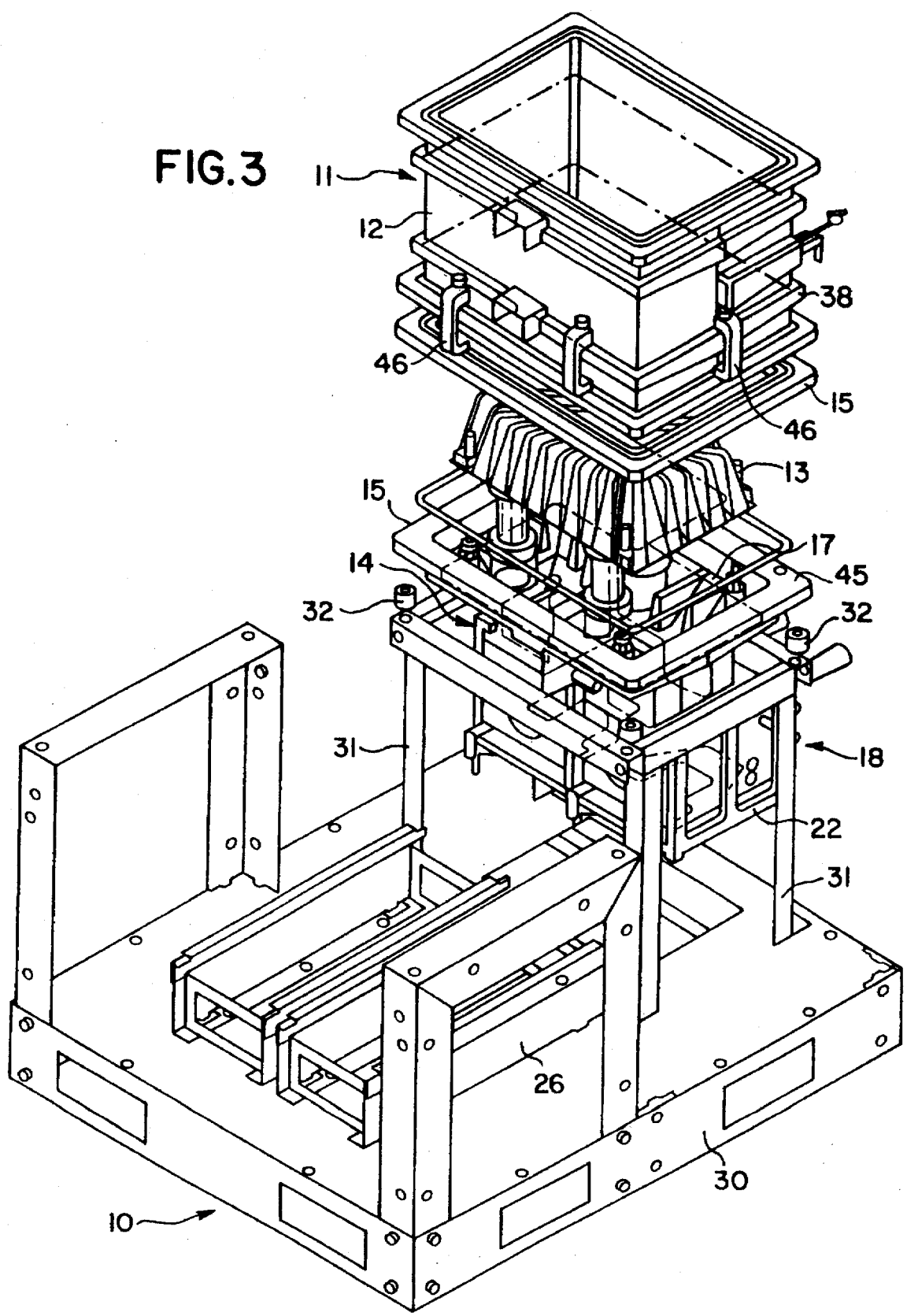
FIG. 3 is another exploded perspective view of the thermoplastic supply system of FIGS. 1 and 2 taken from the rear of the system with the support structure included, but with the drive assembly removed.

The support structure for the supply system 10 is not shown in FIGS. 1 and 2 for the sake of clarity, but it is depicted in FIG. 3. As shown in FIG. 3, the supply system 10 is supported on a base 30 upon which a upstanding frame 31 is mounted. The carriage support 26 is also mounted on the base 30. The reservoir block 16 is supported on the frame 31 with a plurality of isolating spacers 32 mounted therebetween.

While two flow shutoff valves, two manifold assemblies, and two pumps and drive assemblies are shown or described, this is intended to show a typical configuration of the system, and it should be understood that one or more of each of these elements could be used.

As used herein, the "front" of the system 10 and its components is considered to be the side of the system extending forward and to the right in FIGS. 1 and 2, which is also the side from which the shutoff valves 21 are mounted. The "rear" of the system 10 and its components is considered to be the opposite side, that is, the side extending back and to the left in FIG. 1 and 2, which is also the side from which the drive assembly 24 extends.

Figure 4:
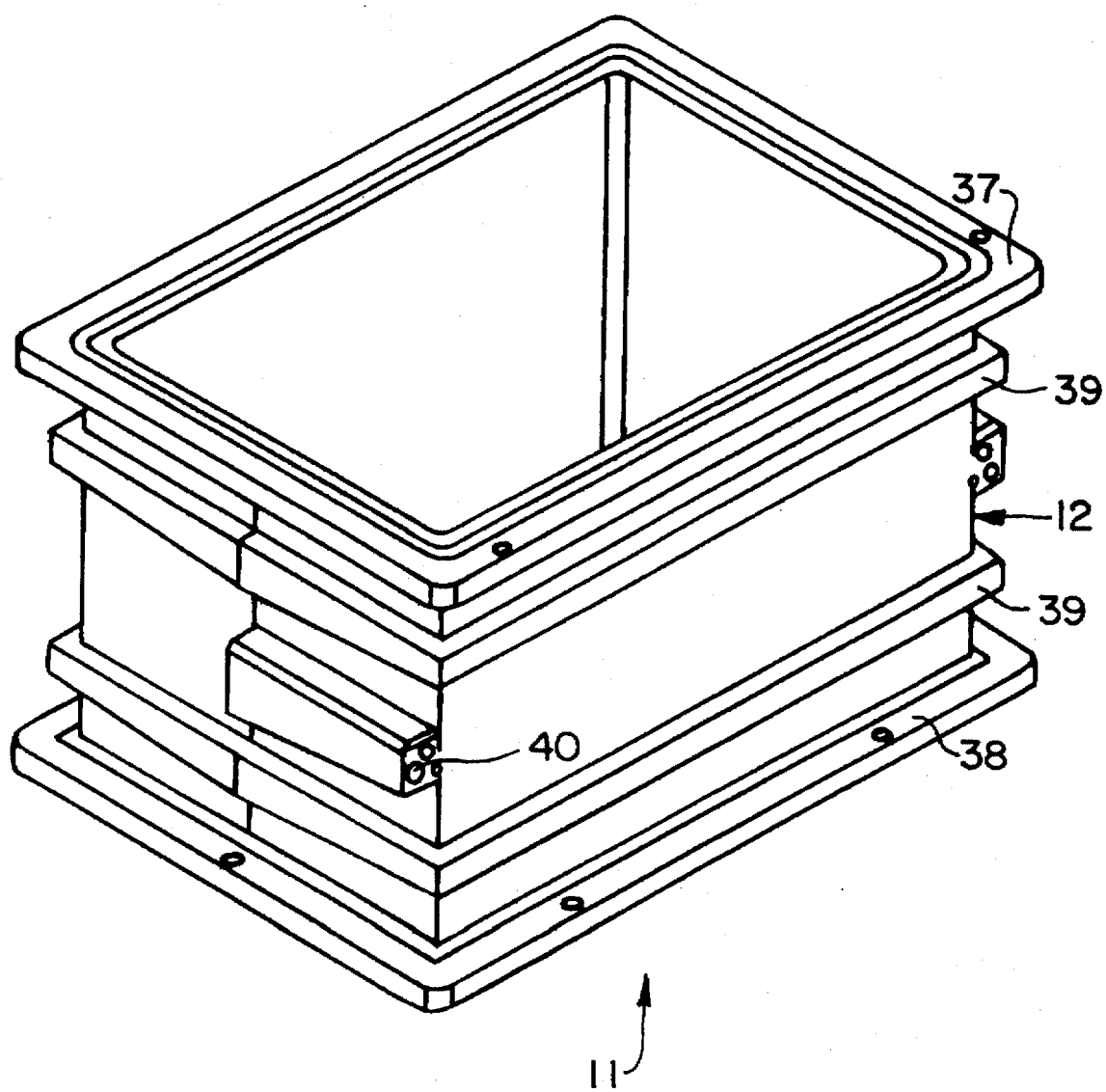
FIG. 4 is a perspective view of the hopper assembly of FIG. 1.

The hopper assembly 11 comprises one or more rectangular hopper units 12, one of which is shown in more detail in FIG. 4. Each of the hopper units 12 has an open top and an open bottom and four side walls. As shown in FIG. 1, a single hopper unit 12 may be used. The hopper unit 12 is preferably cast from a suitable material, such as aluminum, which has good heat conductivity. The inside surfaces of the side walls are preferably coated with a material such as polytetrafluoroethylene (PTFE) which has good non-adhesion properties to prevent the solid thermoplastic material inside the hopper from sticking to the side walls, particularly after solidification. The top and bottom of the hopper unit 12 have flanges 37 and 38 extending around the open top and bottom, respectively, of the hopper unit. The hopper unit 12 is provided with heaters which are used for initial heating of the material inside the hopper unit and to prevent the material in the hopper unit from sticking to the interior side walls. The hopper heater is preferably provided by electrical inductive heating elements which are cast in situ into the hopper unit 12. As shown in FIG. 4, two heating elements are shown, each cast into one of two ridges 39 which extend horizontally around the hopper unit 12 on all four of the side walls. The inductive heating elements are connected to a suitable control system by electrical cables (not shown). An RTD or thermocouple or other temperature sensing device may be provided on either side of the hopper unit 12, inserted into one of two bores 40 provided on each side of the hopper unit.

As shown in FIGS. 1 and 2, the hopper unit 12 is mounted on the top of the reservoir block 16. The reservoir block 16 has a flange 45 extending around the top which corresponds to the flange 38 on the bottom of the hopper unit 12. The rectangular ceramic isolator 15 is positioned between the flange 45 on the top of the reservoir block 16 and the flange 38 on the bottom of the hopper unit 12 to thermally isolate the hopper unit from the reservoir and allow separate temperature control of each. Instead of being directly attached to the reservoir block 16 using bolts or the like, and the hopper unit 12 is attached to the reservoir block with a plurality of C clamps 46.

Figure 5:
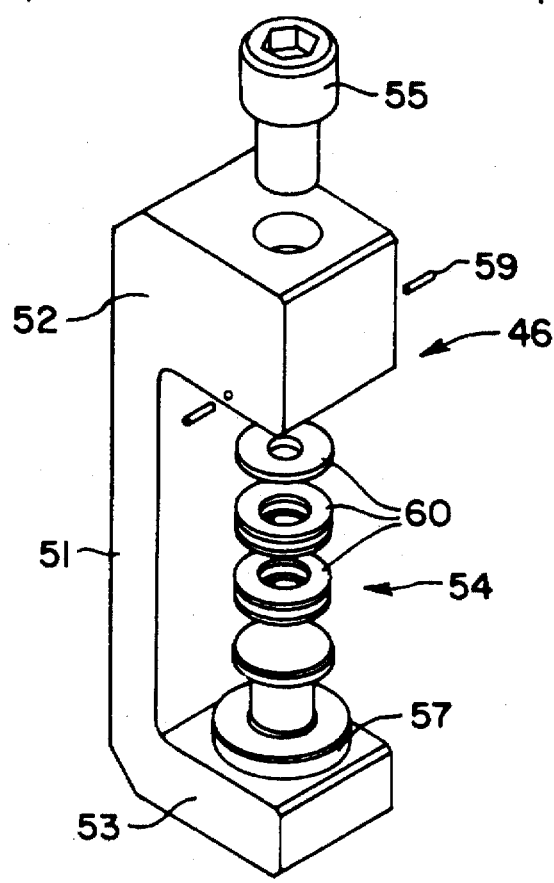
FIG. 5 is a perspective exploded view of one of the clamps used to attach the hopper assembly to the reservoir assembly.
Figure 6:
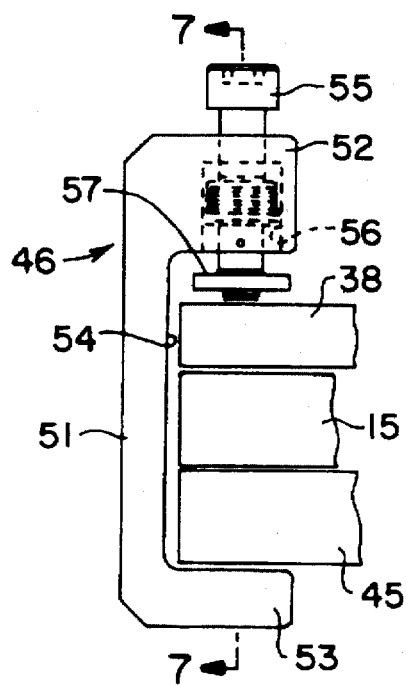
FIG. 6 is a side view of the clamp of FIG. 5.
Figure 7:
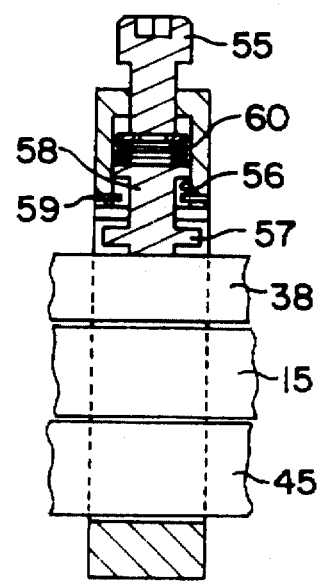
FIG. 7 is a side sectional view of the clamp taken along line 7—7 of FIG. 6.

Each of the clamps 46 is shown in more detail in FIG. 5–7. The clamp 46 comprises a C-shaped body 51 with parallel outwardly extending arms 52 and 53. Between the arms 52 and 53 is a space 54 for the insertion of the flanges 38 and 45 and the isolator 15. An threaded opening is provided in the upper arm 52 of the body 51 for insertion of a bolt 55. The threaded opening connects with a chamber 56 formed in the clamp arm 52 adjacent to the space 54. A clamping thrust member 57 is positioned in the chamber 56. The upper end 58 of the thrust member 57 has an increased diameter portion, which is retained within the chamber 56 by a pair of locking pins 59 which are mounted in the upper arm and extend into chamber 56 adjacent to the clamping space 54. A plurality of spring washers or Belleville washers 60 are positioned in the chamber 56 between the end of the bolt and the upper end 58 of the thrust member. These washers 60 maintain force on the thrust member even when the clamp is heated and expands.

As shown in FIGS. 5 and 7, a plurality of clamps 46 is provided between the hopper unit 12 and the reservoir block 16. When the hopper unit 12 is positioned on the reservoir block 16 with the isolator 15 between, the C-clamps 46 are then inserted onto the flanges with the flanges inserted into the clamping space 54 between the arms of the clamp. The bolt 55 is tightened to urge the thrust member 57 into tight clamping relationship with the lower arm 53, and the spring washers 60 are compressed. In use, as the hopper unit 12 and the reservoir block 16 are heated, the cast metal will expand. As the flanges 38 and 45 expand, the thickness of the flanges will increase. When the components are cooled again, the thickness will decrease. Unlike bolts or other devices which could gouge into the softer aluminum and would tend to loosen through repeated expansion and contraction of the metal components, the clamps 46 of this invention are designed to accommodate these changes without loosening. The spring washers 60 in the clamps are compressed as the components expand due to heating, and the washers expand to accommodate the contraction of the components upon cooling, so that the clamps 46 maintain a securing clamping force on the flanges throughout the heating and cooling cycle of the components.

Figure 8:
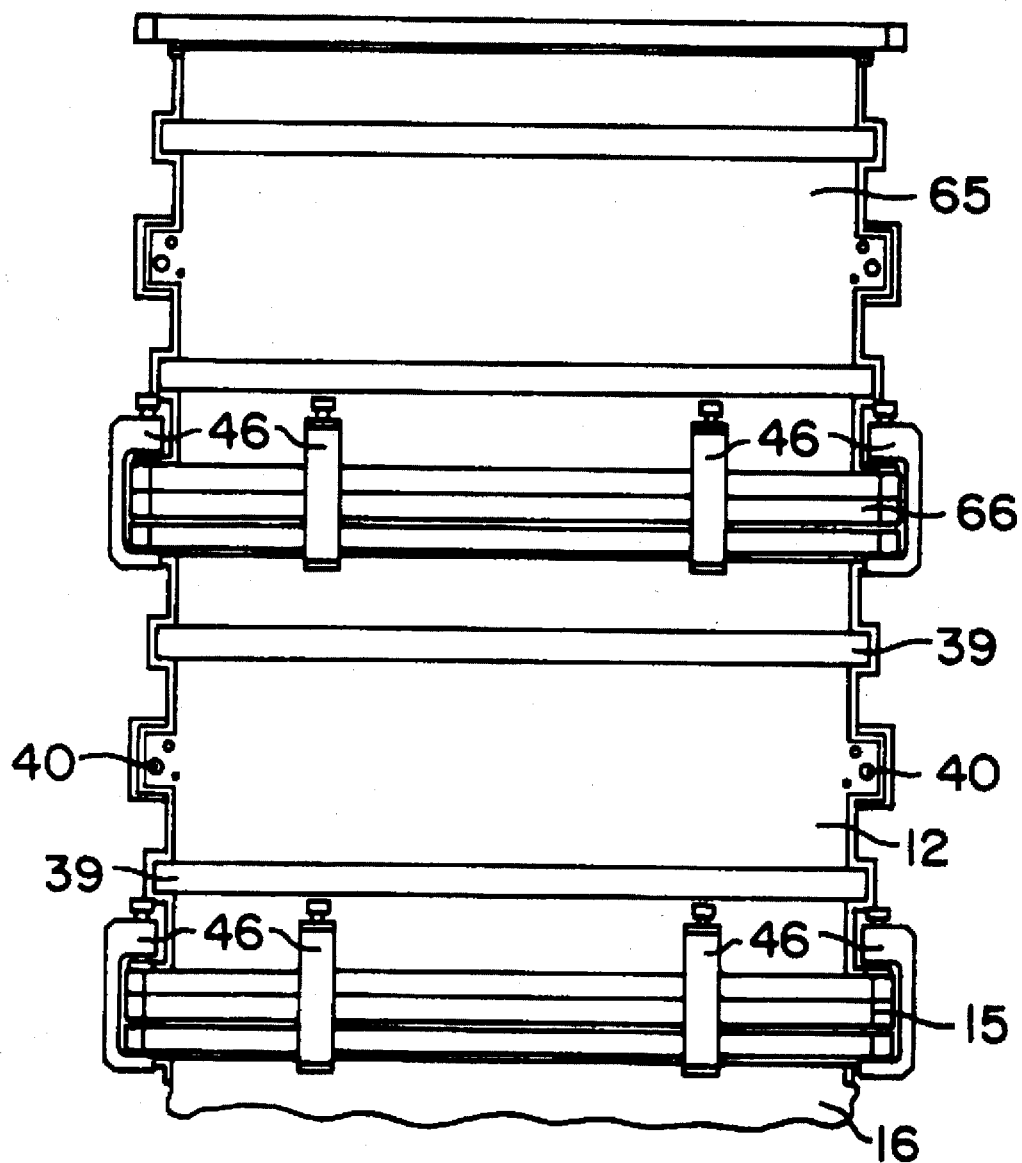
FIG. 8 is a side sectional view of another embodiment of the hopper assembly showing the attachment of two hopper units.

A preferred configuration of the hopper assembly 11 is a single hopper unit 12 mounted on top of the reservoir block 16, as shown in FIG. 1. It may be necessary, however, to increase the capacity of the hopper assembly, if large amounts of thermoplastic material are being used or if one wishes to decrease the rate at which the hopper assembly needs to be refilled. To provide increased capacity, the hopper unit 12 can be removed and replaced with a larger sized hopper unit. Alternatively, an additional hopper unit 65 can be mounted on top of the hopper unit 12, as shown in FIG. 8. The hopper unit 65 is essentially identical to the hopper unit 12, being cast from a metal such as aluminum with cast-in-place heating elements and an inside coating of a non-adhesive material such as PTFE. An isolating 66, similar to the isolator 15 can be positioned between the hopper units 12 and 65 in order to create different heating zones in each hopper unit. In addition to using the clamps 46 to attach the hopper unit to the reservoir block, the clamps 46 can be used to attach the second hopper unit 65 to the hopper unit 12. With each hopper unit providing a different heating zone and with the use of the isolator 66 between the hopper units, the same problems associated with thermal expansion occur as between the hopper unit and the reservoir block 16, and the clamps 46 provide the same advantages in attaching the hopper units 12 and 65 together.

Figure 9:
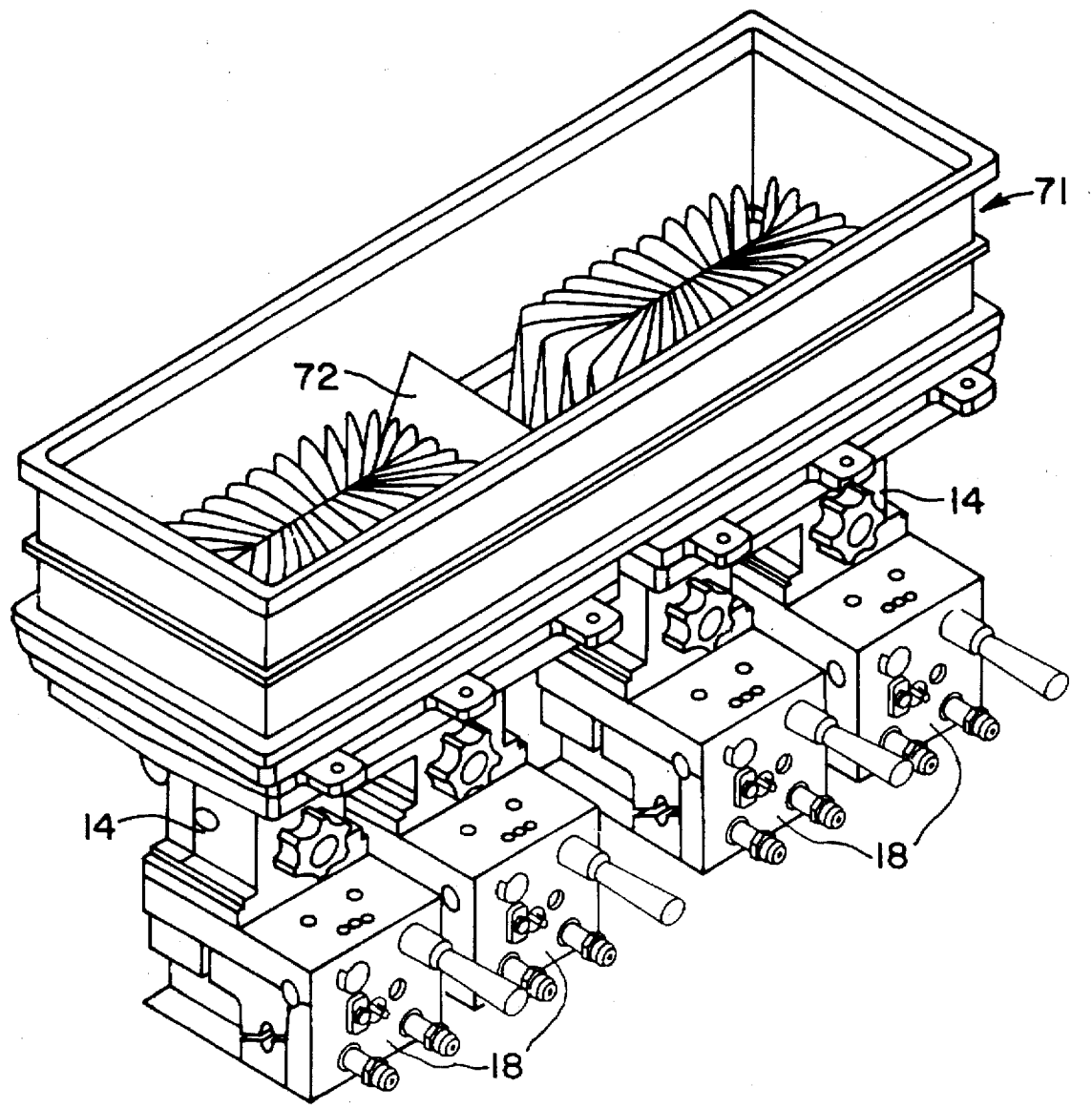
FIG. 9 is a perspective view of another embodiment of the hopper assembly showing a double sized hopper unit.

In other situations, it may be necessary to increase the pumping capacity of the system to supply a larger quantity of thermoplastic material to additional applicators. In this case, additional melting and pumping units can be added as shown in FIG. 9. Two reservoir assemblies 14, with two melting grids 13, and two pairs of manifold assemblies 18 are shown, effectively doubling the output capacity of the system. A double sized hopper unit 71 can be then provided spanning the two reservoir assemblies 14. The hopper unit 71 is similar in construction to the hopper unit 12, being made of aluminum with cast-in-place inductive heating elements and locations for RTDs or thermocouples along each side of the hopper unit. The hopper unit 71, like the hopper unit 12 also has an inside coating of PTFE. Since the hopper unit 71 is larger than the hopper unit 12, it may be desirable to use two RTDs, one on each side of the hopper unit, to provide a more accurate temperature reading. The hopper unit 71 is slightly more than twice as wide as the hopper unit 12, in order to allow it to span the pair of reservoirs 17. The hopper unit 71 also includes a divider 72 which covers the space between the two adjacent reservoir assemblies to prevent thermoplastic material from entering this space. The divider 72 has an inverted V-shape to direct the material to one of the reservoirs and is attached by a bolt or screw inserted from the bottom. The thermocouple or RTD can be positioned in the divider 72 instead of along the side of the hopper unit 71, if desired.

The capacity of the double sized hopper unit 71 can also be increased if desired, either by providing another hopper unit 71 stacked on top of the hopper unit 71 similar to the hopper units 12 and 65, or by providing a hopper unit 71 with an increased capacity.

The provision of the double sized hopper unit 71 allows the user to configure the system so that a single supply of solid thermoplastic material can be maintained and fed through several grid heater and reservoir assemblies, while maintaining the capability of reconfiguring the system if needs change to provide separate smaller hopper assemblies so that different adhesives can be used and separated from one another. The grid melters, reservoirs and pumping components remain the same, and only the hopper configuration needs be changed.

While the hopper unit 71 is shown in FIG. 9 with two reservoir assemblies and associated other supply elements, it should be understood that an even larger sized hopper unit could be used spanning three or more reservoir assemblies. These larger hopper units can be removed and replaced with hopper units 12 or 71 as desired, depending upon the needs of the dispensers. The system of the present invention is thus completely flexible, and any number and various configurations of hopper units can be used in order to accommodate the desired hopper capacity and heating arrangement and in order to supply the necessary number of pumps.

In order to permit the hopper units to be stacked, each of the hopper units is made without a "draft", that is, each of the sides of each hopper unit is parallel, so that the hopper inlet and outlet dimensions match. In prior art hoppers, the sides sloped, either inwardly or outwardly, to create a "draft". The draft assisted in the manufacture of the cast hopper units since the casting insert could be more easily removed, but it also assisted in handling the expansion of the adhesive when the system is started up and the solid adhesive melts. The problems that indicated the need for a draft are avoided by using a heated hopper unit with heating elements cast into the hopper units to initially heat the adhesive along the sides of the hopper unit during start-up. When this adhesive melts first, it moves easily relative to the hopper walls, so that no draft is needed. The hopper walls are heated to about 260° F. The stackable hopper units permit the user to determine how big the hopper needs to be without buying separate hoppers for this purpose.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A system for supplying melted thermoplastic material to a dispenser, which comprises:

a reservoir block for receiving melted material, the reservoir block including a reservoir into which melted material flows, the reservoir block having a flange;

a hopper assembly for storing solid thermoplastic material, the hopper assembly supported on the reservoir block and having a flange adjacent to the reservoir block flange, the hopper assembly comprising at least one hopper unit having an top inlet and a bottom outlet, the hopper unit having side walls and including a heating element for heating the thermoplastic material adjacent to the side walls, opposite side walls being generally parallel to each other, the inlet and the outlet having generally the same cross section;

a heating grid at the outlet of the hopper assembly for heating and melting the solid thermoplastic material in the hopper, the melted thermoplastic material flowing to the reservoir; and a manifold and pump assembly connected to the reservoir block for receiving material from the reservoir and pumping the material to the dispenser.

2. A system for supplying melted thermoplastic material as defined in claim 1, wherein the hopper assembly comprises at least two hopper units each having an top inlet and a bottom outlet having generally the same cross section, the two hopper units stacked on top of one another, each of the hopper units being substantially identical.

3. A system for supplying melted thermoplastic material as defined in claim 1, wherein the hopper unit is attached to the reservoir block by a plurality of clamps.

4. A system for supplying melted thermoplastic material as defined in claim 3, wherein each of the clamps comprises a pair of arms defining a space into which the flanges are positioned, a thrust member which engages the flanges to hold the flanges against one of the arms, and a clamping mechanism to secure the thrust member, the clamping mechanism including at least one spring member to retain thrust force on the thrust member while accommodating expansion and contraction of the flanges.

5. A system for supplying melted thermoplastic material to a dispenser, which comprises:

a plurality of reservoir blocks for receiving melted material, each reservoir block including a reservoir into which melted material flows, each reservoir block having a flange;

a hopper assembly for storing solid thermoplastic material, the hopper assembly supported on the plurality of reservoir blocks and having a flange adjacent to the reservoir block flanges, the hopper assembly straddling the plurality of reservoir blocks to supply melted material to all of the reservoirs;

a plurality of heating grids at the outlet of the hopper for heating and melting the solid thermoplastic material in the hopper, each of the heating grids associated with one of the reservoirs with the melted thermoplastic material flowing to the associated reservoir; and a plurality of manifold and pump assemblies, each connected to one of the reservoir blocks for receiving material from the reservoir and pumping the material to a dispenser.

6. A system for supplying melted thermoplastic material as defined in claim 5, wherein the hopper assembly includes a divider between the two reservoir blocks for preventing flow of the molten material between the reservoir blocks.

7. A system for supplying melted thermoplastic material as defined in claim 6, wherein the divider extends completely across the hopper assembly.

8. A system for supplying melted thermoplastic material as defined in claim 5, wherein the hopper assembly is attached to the reservoir blocks by a plurality of clamps.

9. A system for supplying melted thermoplastic material to a dispenser, which comprises:

a reservoir block for receiving melted material, the reservoir block including a reservoir into which melted material flows, the reservoir block having a flange;

a hopper assembly for storing solid thermoplastic material, the hopper supported on the reservoir block and having a flange adjacent to the reservoir block flange;

a heating grid at the outlet of the hopper for heating and melting the solid thermoplastic material in the hopper, the melted thermoplastic material flowing to the reservoir; and a manifold and pump assembly connected to the reservoir block for receiving material from the reservoir and pumping the material to the dispenser;

the hopper assembly comprising at least one hopper attached to the reservoir block by a plurality of clamps, each of the clamps comprising a pair of arms defining a space into which the flanges are positioned, a thrust member which engages the flanges to hold the flanges against one of the arms, and a clamping mechanism to secure the thrust member, the clamping mechanism including at least one spring member to retain thrust force on the thrust member while accommodating expansion and contraction of the flanges.

10. A system for supplying melted thermoplastic material as defined in claim 9, wherein the hopper assembly comprises at least two hopper units, one hopper unit stacked on top of the other hopper unit, the hopper units attached to each other by a plurality of the clamps.

11. A system for supplying melted thermoplastic material to a dispenser, which comprises:

a reservoir block for receiving melted material, the reservoir block including a reservoir into which melted material flows, the reservoir block having a flange;

a hopper assembly for storing solid thermoplastic material, the hopper assembly comprising a plurality of hopper units each having upper and lower flanges, one of the hopper units supported on the reservoir block and having its lower flange adjacent to the reservoir block flange;

at least one isolator for thermally isolating one of the hopper units from the reservoir block and for thermally isolating the hopper units from each other, the isolator comprising a band of insulating material positioned between the flanges of the hopper unit and the reservoir block;

a heating grid at the outlet of the hopper for heating and melting the solid thermoplastic material in the hopper, a manifold and pump assembly connected to the reservoir block for receiving material from the reservoir and pumping the material to the dispenser.

12. A system for supplying melted thermoplastic material as defined in claim 11, wherein the hopper unit is attached to the reservoir block by a plurality of clamps.

13. A system for supplying melted thermoplastic material as defined in claim 12, wherein each of the clamps comprises a pair of arms defining a space into which the flanges are positioned, a thrust member which engages the flanges to hold the flanges against one of the arms, and a clamping mechanism to secure the thrust member, the clamping mechanism including at least one spring member to retain thrust force on the thrust member while accommodating expansion and contraction of the flanges.

* * * * *